United States Patent
Wubben et al.

(10) Patent No.: US 11,642,928 B2
(45) Date of Patent: May 9, 2023

(54) SELF-PROPELLED SPRAYER SUSPENSION TRAVEL REDUCTION MECHANISM

(71) Applicant: Deere & Company, Moline, IL (US)

(72) Inventors: Thomas M. Wubben, Ankeny, IA (US); Joshua J. Fausch, Polk City, IA (US); Daniel C. Jordan, Ames, IA (US)

(73) Assignee: Deere & Company, Moline, IL (US)

( * ) Notice: Subject to any disclaimer, the term of this patent is extended or adjusted under 35 U.S.C. 154(b) by 268 days.

(21) Appl. No.: 17/084,059

(22) Filed: Oct. 29, 2020

(65) Prior Publication Data
US 2022/0134826 A1 May 5, 2022

(51) Int. Cl.
*B60G 11/46* (2006.01)

(52) U.S. Cl.
CPC ...... *B60G 11/465* (2013.01); *B60G 2202/152* (2013.01); *B60G 2300/08* (2013.01)

(58) Field of Classification Search
CPC ............ B60G 11/465; B60G 2202/152; B60G 2300/08; B60G 15/02; B60G 2300/082; B60G 2204/45; B60G 2204/4502; B62D 49/0607
USPC .................................................. 280/124.162
See application file for complete search history.

(56) References Cited

U.S. PATENT DOCUMENTS

| | | | | |
|---|---|---|---|---|
| 5,597,172 | A * | 1/1997 | Maiwald | B60G 3/00 280/124.157 |
| 7,168,717 | B2 | 1/2007 | Wubben et al. | |
| 7,717,443 | B1 * | 5/2010 | Carlson | B60G 17/02 280/124.155 |
| 8,534,686 | B1 * | 9/2013 | Slawson | B62D 7/06 280/124.147 |
| 11,383,573 | B2 * | 7/2022 | Zink | B60G 3/01 |
| 2004/0012136 | A1 * | 1/2004 | Mennesson | B60G 15/065 267/219 |
| 2009/0127812 | A1 | 5/2009 | Copsey et al. | |
| 2020/0130741 | A1 | 4/2020 | Crowley et al. | |
| 2020/0317486 | A1 | 10/2020 | Puszkiewicz et al. | |

FOREIGN PATENT DOCUMENTS

GB          2306415 A       5/1997

OTHER PUBLICATIONS

Extended European Search Report and Written Opinion issued in European Patent Application No. 21201284.3, dated Mar. 18, 2022, in 08 pages.

* cited by examiner

*Primary Examiner* — Paul N Dickson
*Assistant Examiner* — Caitlin Anne Miller
(74) *Attorney, Agent, or Firm* — Tucker Ellis LLP; Heather M. Barnes; Michael G. Craig

(57) ABSTRACT

An agricultural vehicle suspension may comprise a spring and a first spindle operably coupled with the spring in a spindle axial direction. A stop body may be operably coupled to the first spindle in a cylinder axial direction. The stop body may be configured to limit an axial length of travel of the suspension relative to the first spindle. The first spindle may be a steering spindle or a suspension spindle.

19 Claims, 15 Drawing Sheets

SELF-PROPELLED SPRAYER SUSPENSION TRAVEL REDUCTION MECHANISM

BACKGROUND

Operator comfort in agricultural vehicles is often desired given the length of time the operator spends in the fields or even on roadways. Given various undulations and changes in terrain in a fields bearing crops, suspension mechanisms are often utilized to enable tires to move about the terrain changes yet provide the operator stability and comfort. However, when operators are driving agricultural vehicles on roadways, including without limitation, during turning events, the same amount of axial travel of a suspension may not be desired. As such, there is a desire to provide a suspension travel reduction mechanism to improve agricultural vehicle stability and operator comfort.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation an agricultural vehicle suspension may comprise a spring and a first spindle operably coupled with the spring in a spindle axial direction. A stop body may be operably coupled to the first spindle in a stop body axial direction. The stop body may be adjustable. The stop body may be configured to limit an axial length of travel of the suspension relative to the first spindle. The first spindle may be a steering spindle or a suspension spindle.

In another implementation, the adjustable stop body may be a cylinder. The cylinder may comprise an extended position and a retracted position. The extended position of the cylinder may be configured to limit the axial length of travel of the suspension.

In another implementation, the adjustable stop body axial direction may be substantially parallel to the spindle axial direction.

In another implementation, the adjustable stop body may be actuated by one or more of a steering sensor, a transmission, a manual switch, or automatic engagement.

In another implementation, the suspension may be selectably engageable for on-road agricultural vehicle travel.

In another implementation, the agricultural vehicle suspension may further comprise a stop bracket operably connected with the first spindle. The stop bracket may be in selectable contact with the stop body.

In another implementation, the adjustable stop body may be a cylinder. The cylinder may comprise a first portion and a second portion operably extendable with the first portion. The second portion may be configured to contact the stop bracket to reduce the axial length of travel of the suspension when in the extended position.

In another implementation, the first spindle may be a single suspension spindle.

In another implementation, the agricultural vehicle suspension may further comprise a second spindle.

In another implementation, the first spindle and the second spindle may be dual suspension spindles.

In another implementation, the first spindle may be a steering spindle.

In another implementation, the first spindle and the second spindle may be steering spindles.

In another implementation, the second steering spindle may be substantially parallel to the first steering spindle. The adjustable stop body may be operably connected to the first steering spindle.

In another implementation, the suspension may be steerable or nonsteerable.

In another implementation, the agricultural vehicle suspension may comprise a first steering spindle and a second steering spindle. The cylinder may be operably connected to the first steering spindle or the first suspension spindle.

In another implementation, the spring of the agricultural vehicle suspension may be one or more of an air spring, a coil spring, a leaf spring, or a nitrogen accumulator configured to act as a spring hydraulically.

In another implementation, an agricultural vehicle suspension may comprise an air spring. A first steering spindle may be operably coupled with the air spring in a spindle axial direction. A first suspension spindle may be operably coupled with the air spring in the spindle axial direction. An adjustable stop body may be operably coupled to the first steering spindle or the first suspension spindle in a stop body axial direction. The adjustable stop body may be configured to limit an axial length of travel of the suspension relative to the first spindle. The stop body axial direction may be parallel to the spindle axial direction. The adjustable stop body may comprise an extended position and a retracted position. The extended position of the stop body may be configured to limit the axial length of travel of the suspension. The stop body may be configured to be actuated automatically or manually. The suspension may be selectably engageable for on-road agricultural vehicle travel. The suspension may be steerable or nonsteerable. The suspension may be configured to be a single spindle suspension or a dual spindle suspension.

A method for limiting axial travel of a suspension may comprise applying pressure to a spring. Next, the spring may be compressed. A length of axial suspension travel may be defined. A cylinder may be actuated to an extended position. The cylinder may be operably connected to a first spindle. The first spindle may be operably connected to the spring. The extended cylinder position may be in an axial direction parallel to the axial suspension travel. The length of axial suspension travel may be reduced.

The method for limiting axial travel of a suspension may comprise decreasing pressure in the spring; extending the spring to a centered position; and maintaining the cylinder in the extended position to maintain the reduced length of axial travel.

The method for limiting axial travel of a suspension wherein a stop bracket may be operably connected to the first spindle. The axial length of travel may be between the cylinder and the stop bracket.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
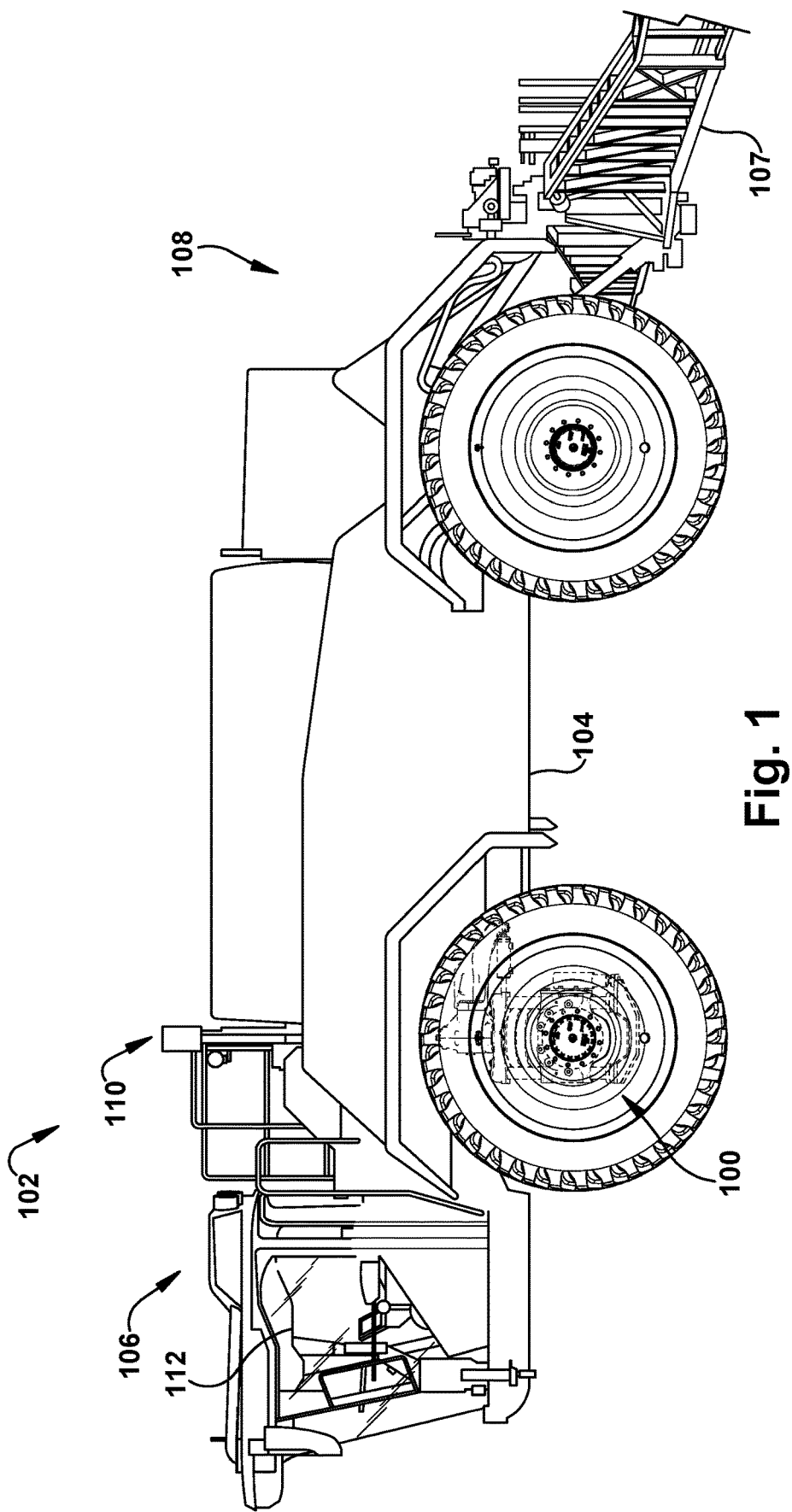
FIG. 1 is a perspective view of an agricultural vehicle.
Figure 2:
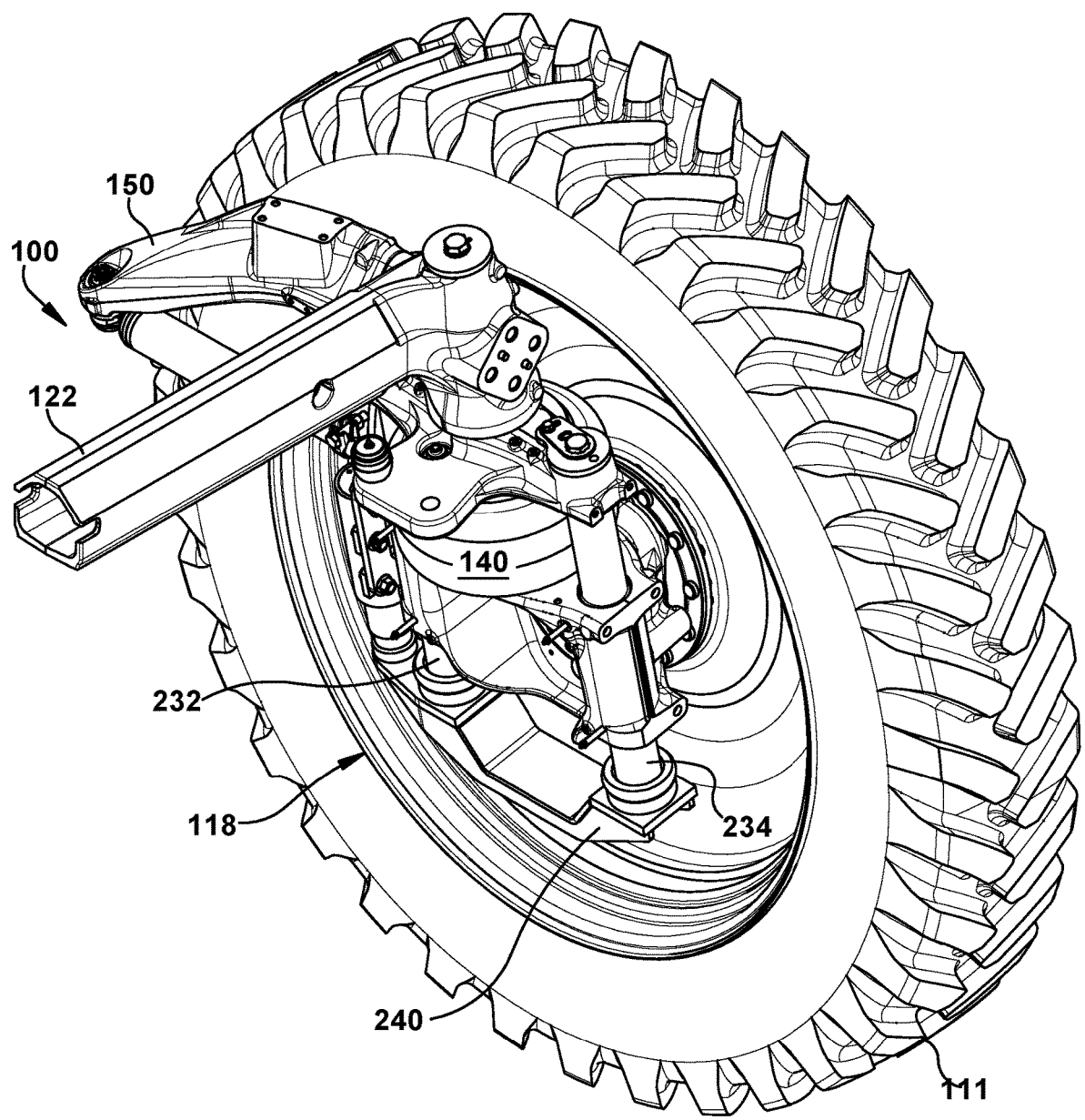
FIG. 2 is a perspective view of one implementation of an agricultural vehicle suspension.
Figure 3:
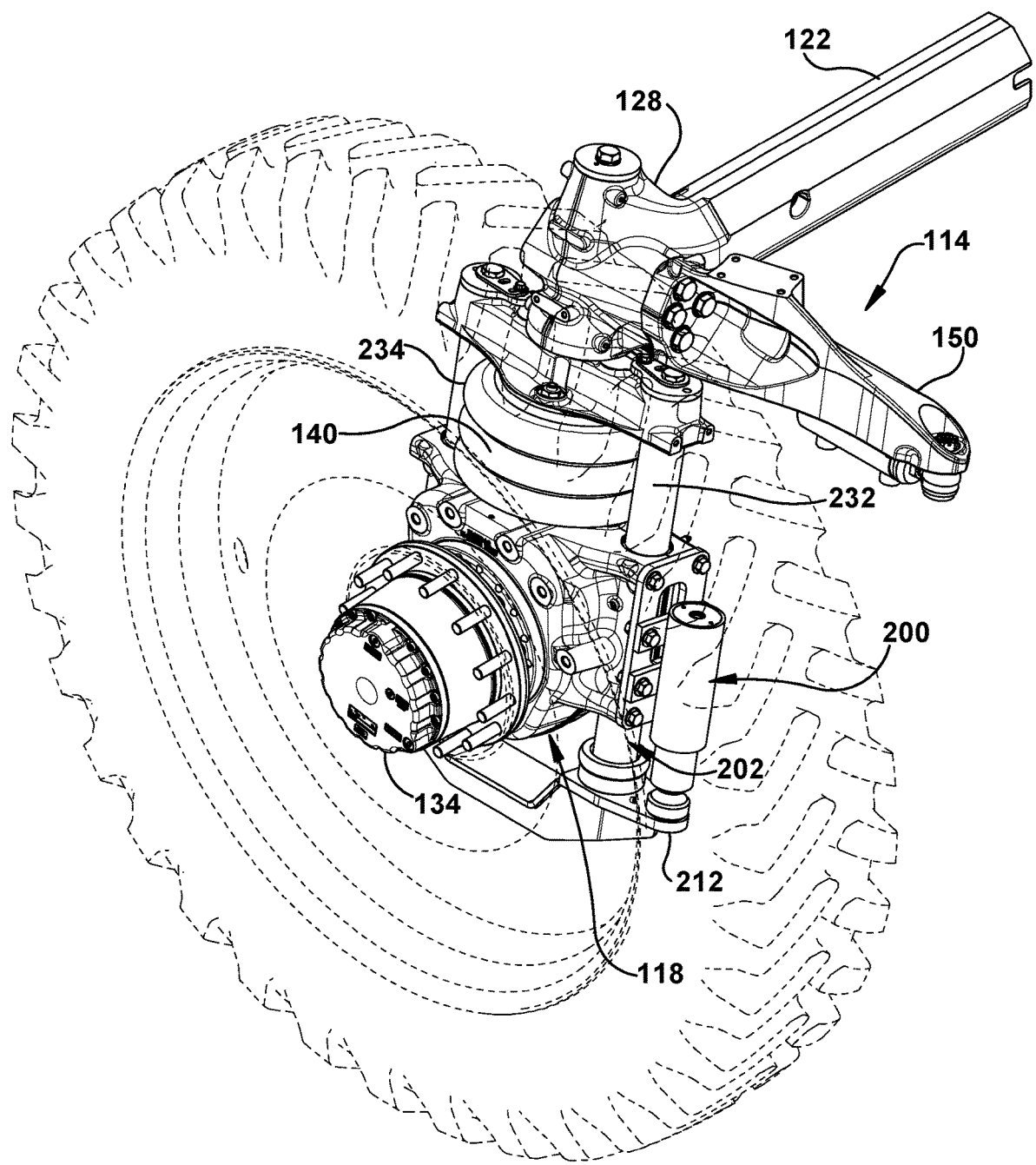
FIG. 3 is a rear perspective view of FIG. 2.
Figure 4:
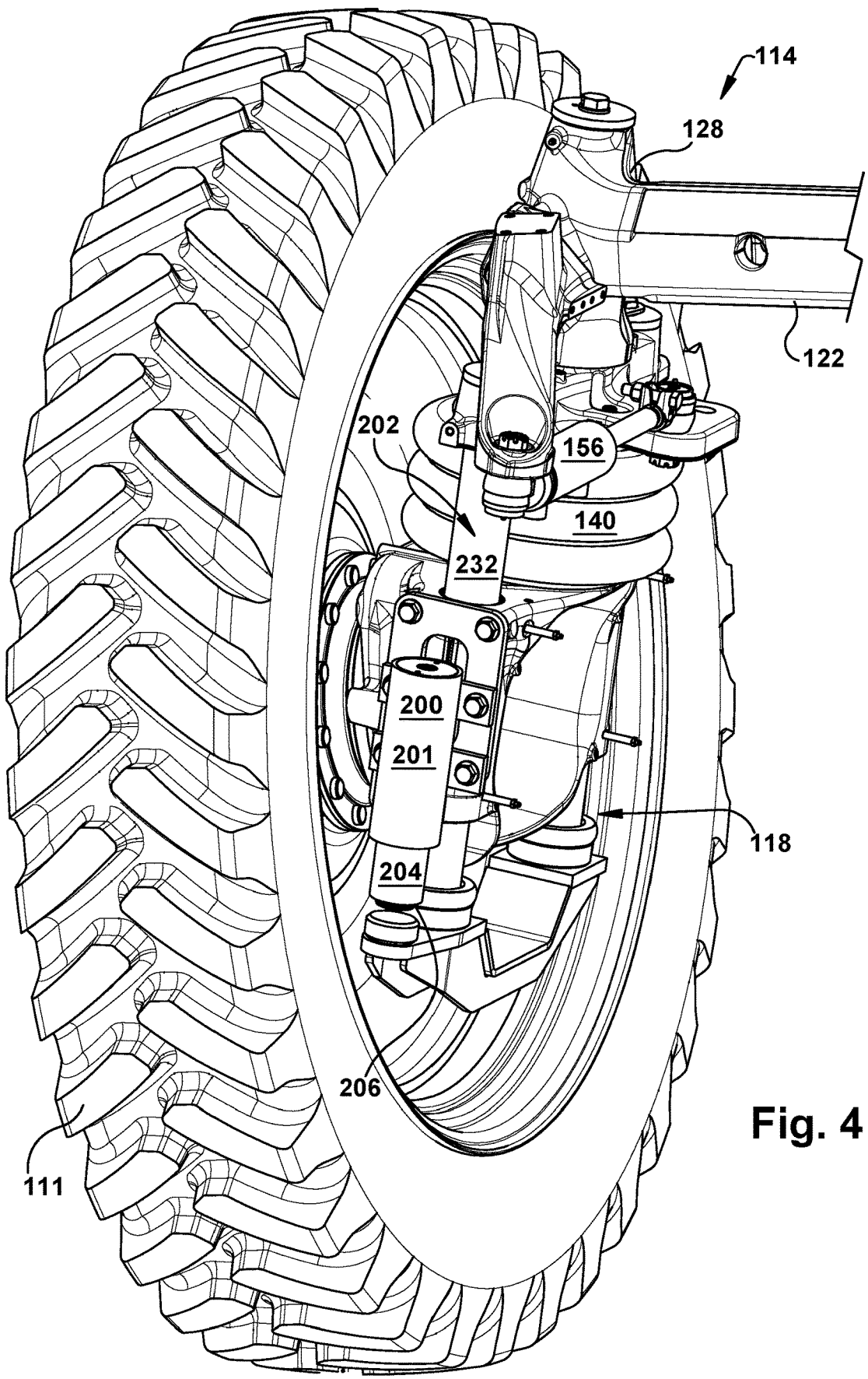
FIG. 4 is a left perspective view of FIG. 2.
Figure 5:
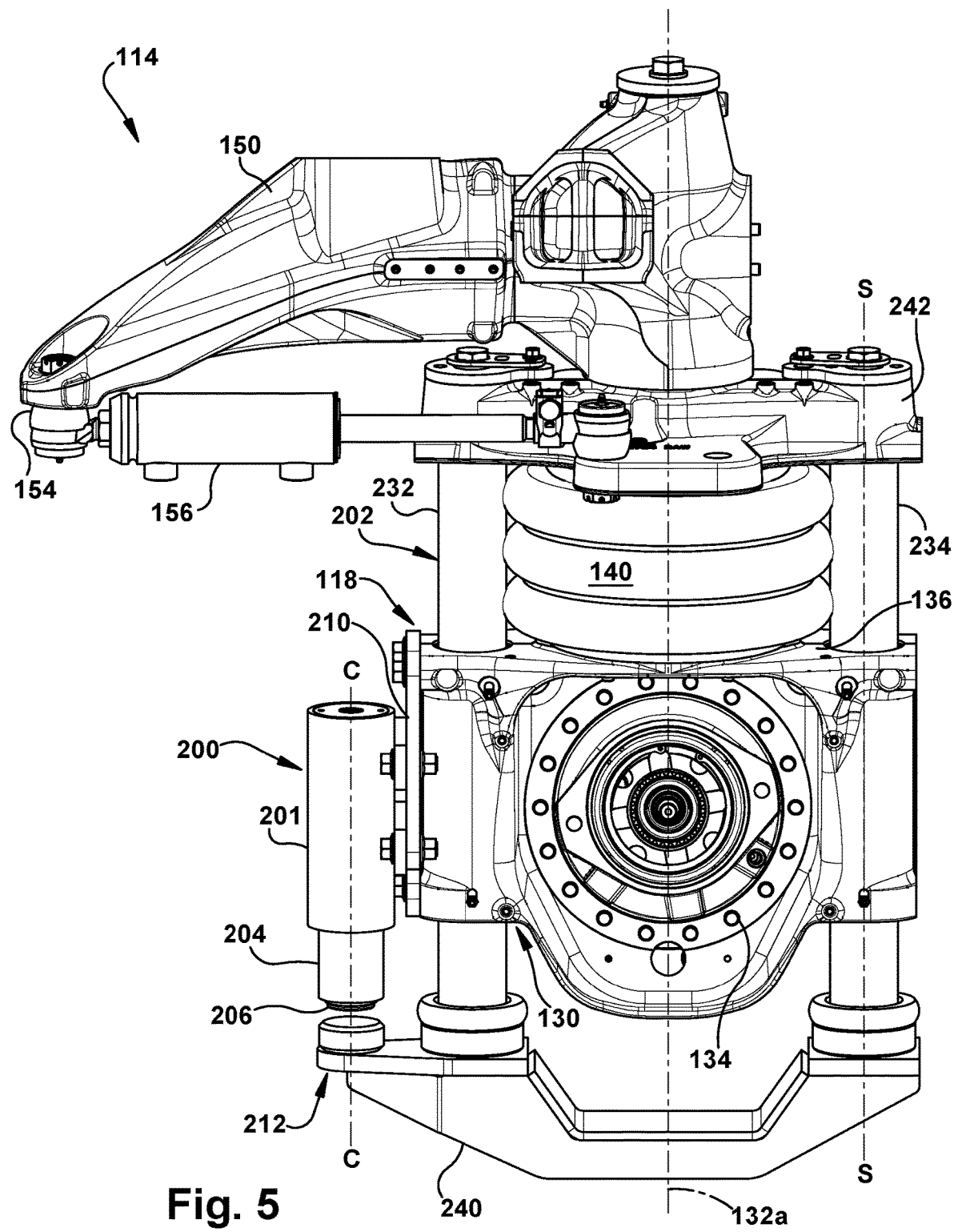
FIG. 5 is a front perspective view of an agricultural vehicle suspension.
Figure 6:
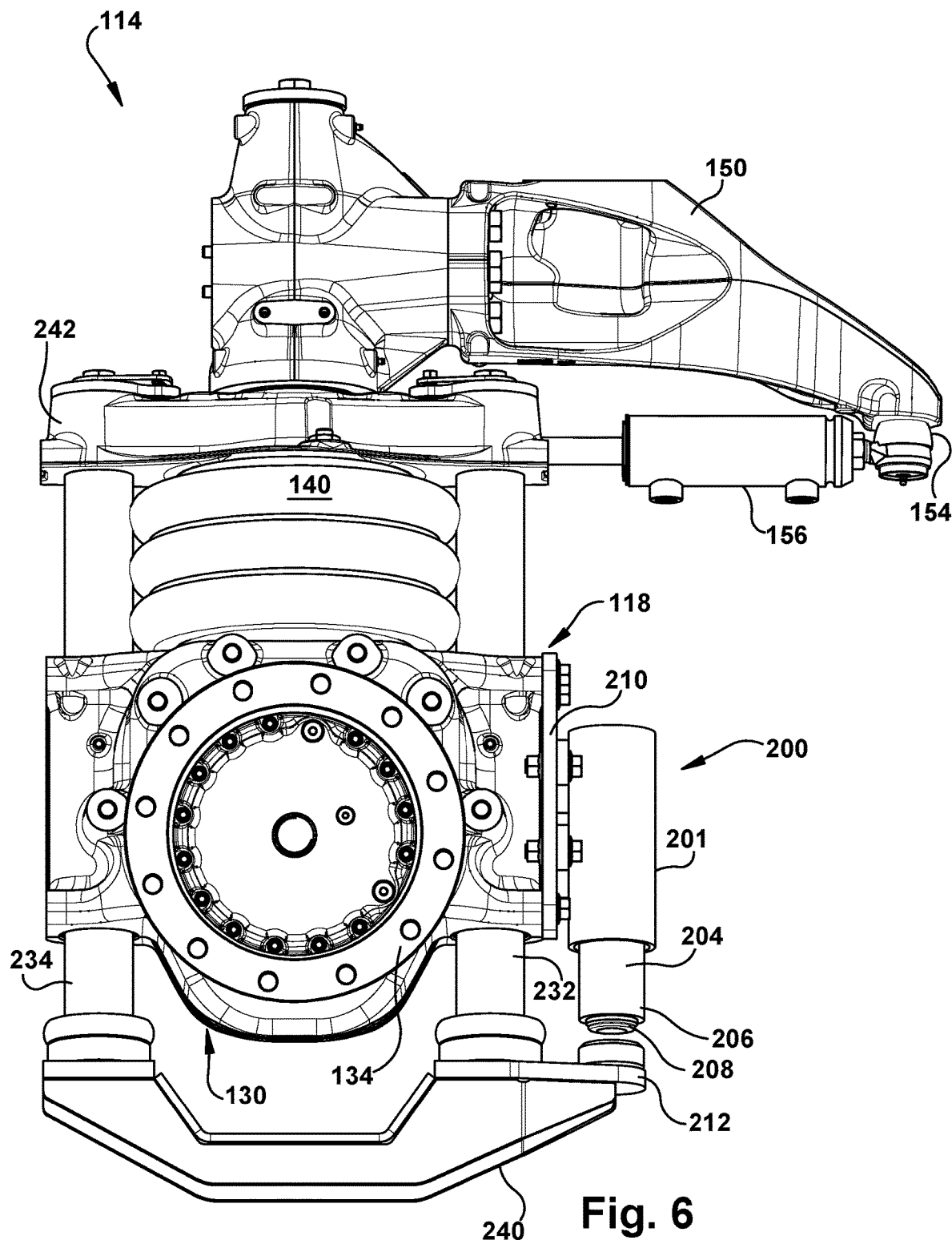
FIG. 6 is a rear perspective view of FIG. 5.
Figure 7:
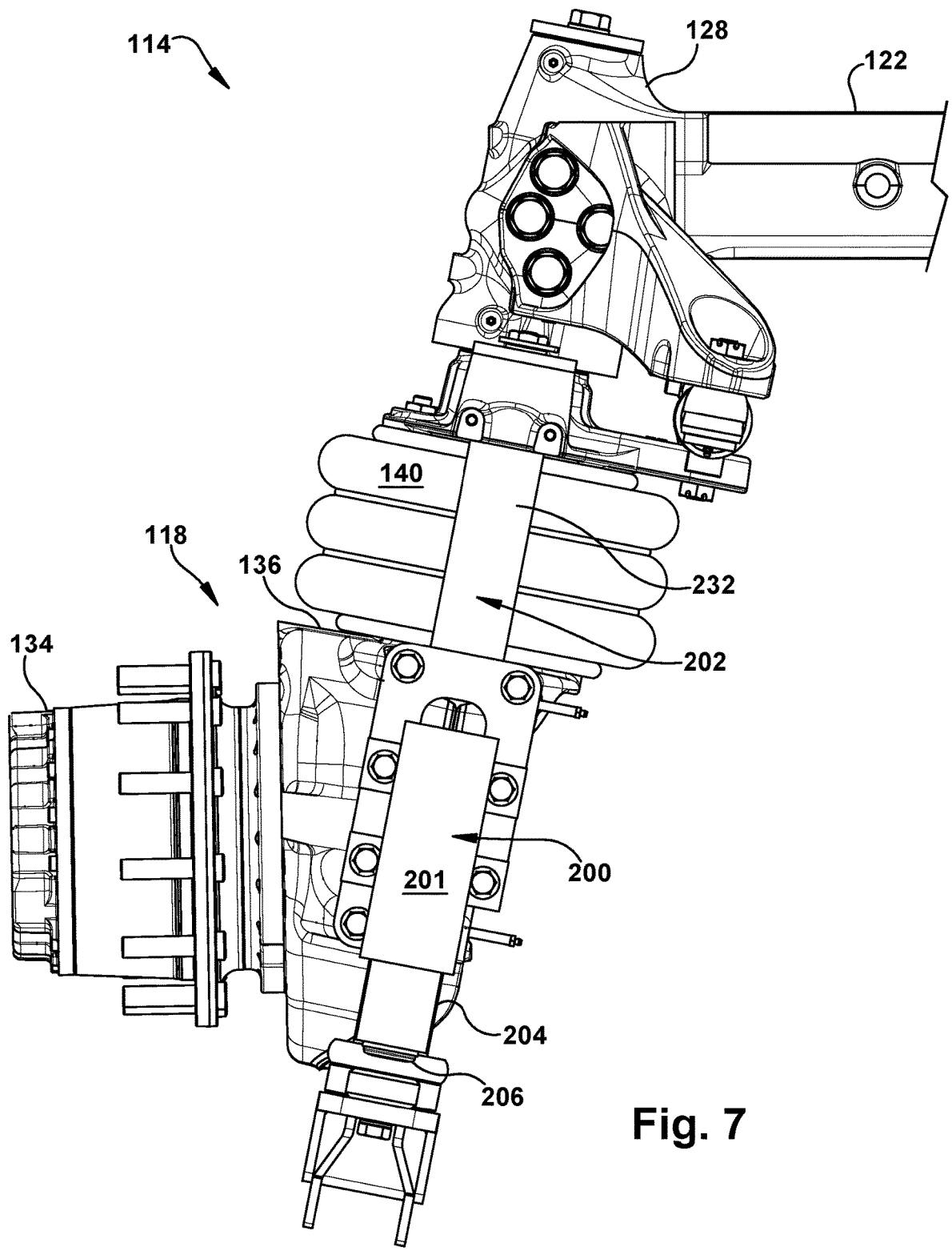
FIG. 7 is a left perspective view of FIG. 5.
Figure 8:
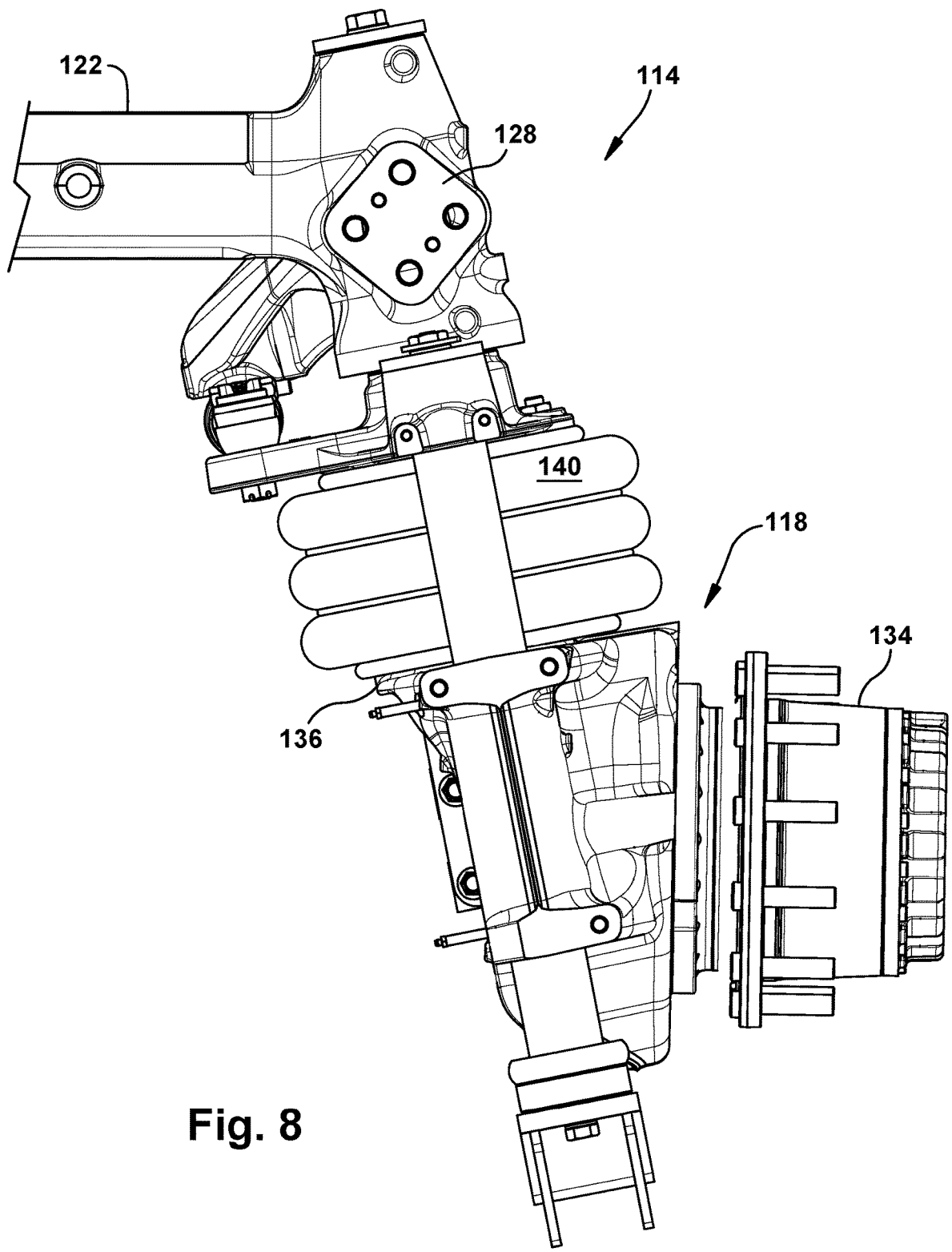
FIG. 8 is a right perspective view of FIG. 5.
Figure 9:
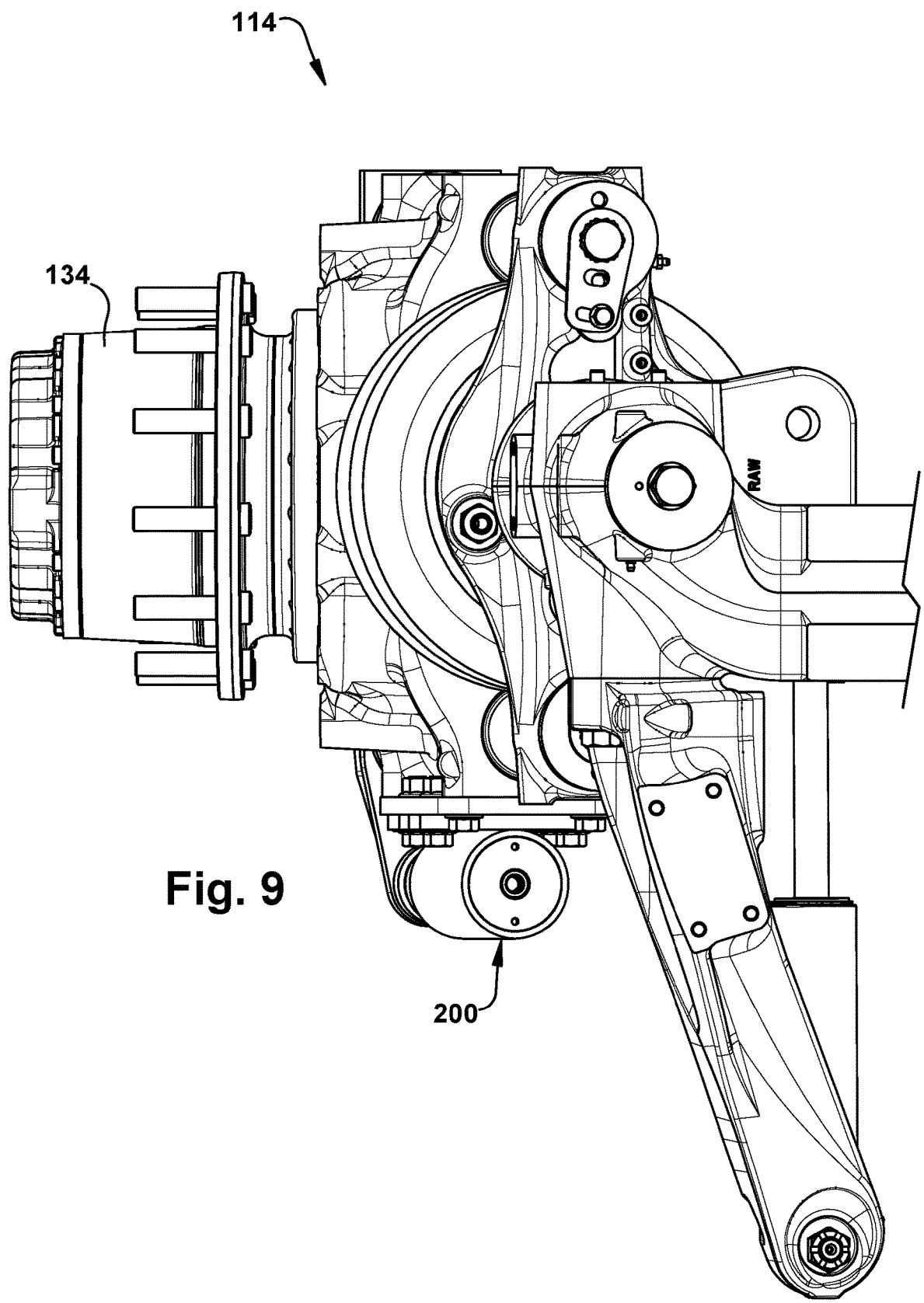
FIG. 9 is a top perspective view of FIG. 5.
Figure 10:
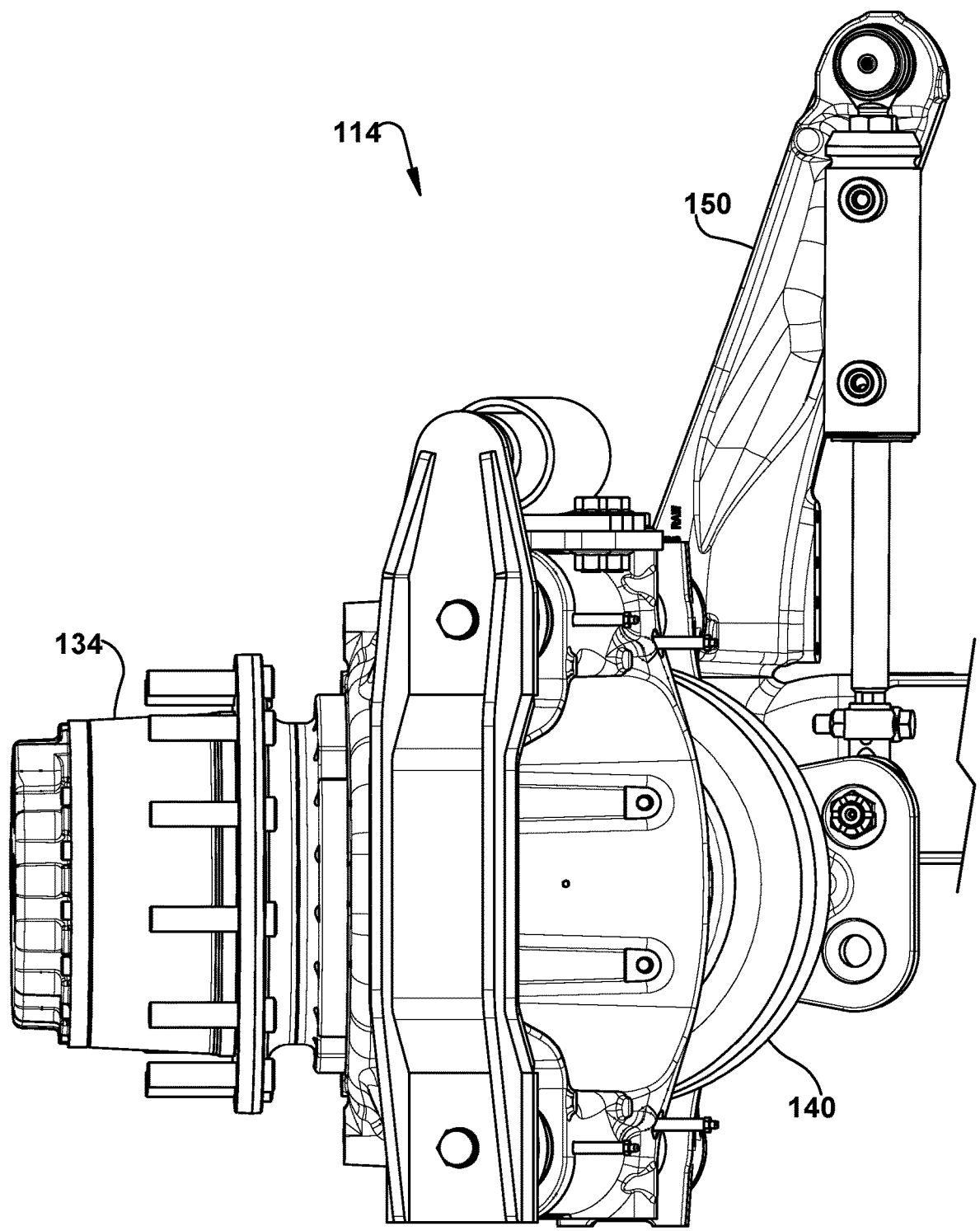
FIG. 10 is a bottom perspective view of FIG. 5.
Figure 11:
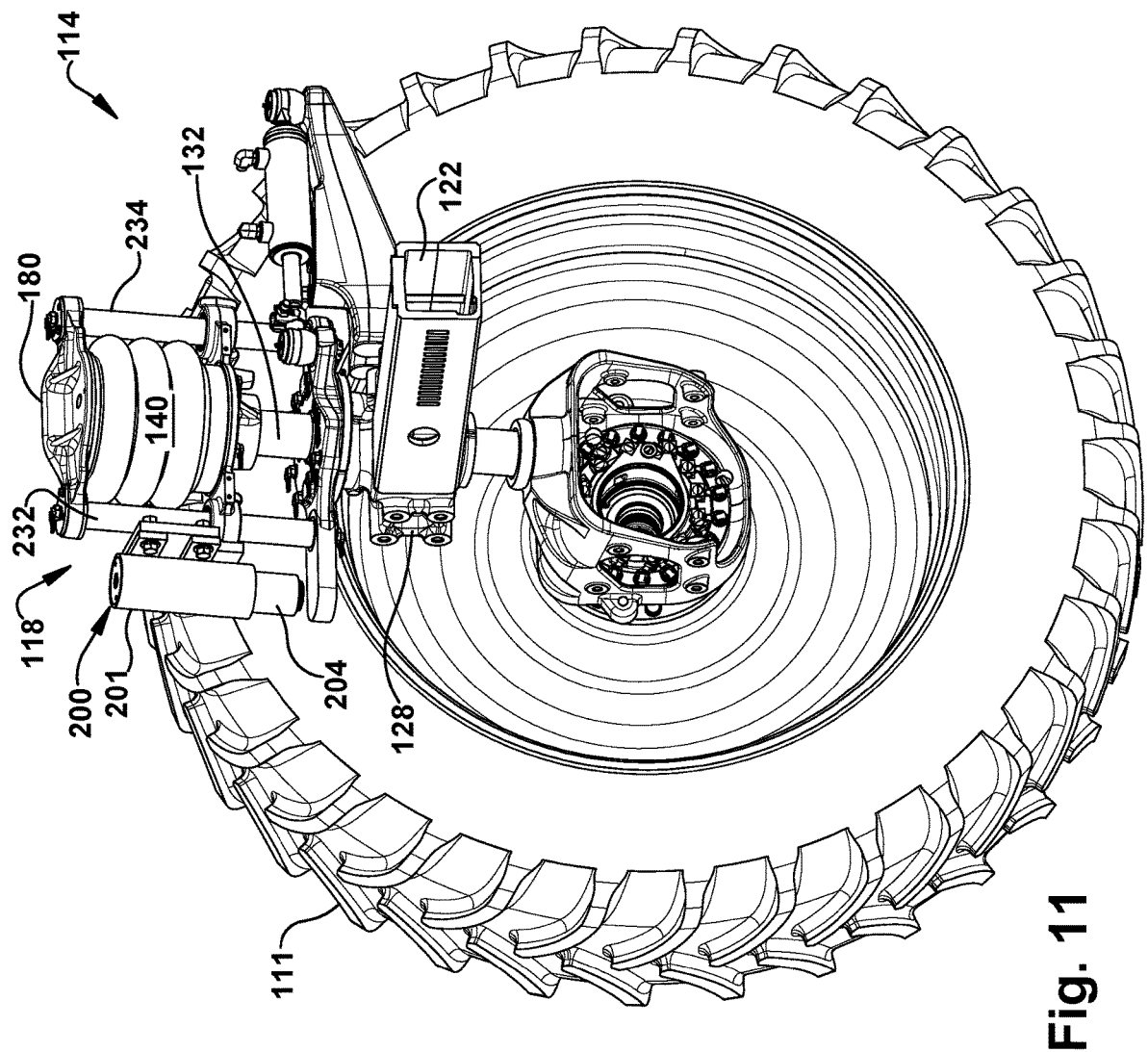
FIG. 11 is another implementation of an agricultural vehicle suspension.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring now to FIGS. 1-19, an agricultural vehicle suspension reduction mechanism 100 is illustrated. The agricultural vehicle suspension reduction mechanism 100 may be utilized on any type of agricultural vehicle 102, including without limitation, sprayers, including self-propelled sprayers, tractors, seeders, harvesters, and implements. The agricultural vehicle 102 may comprise a frame 104. The frame may have a fore portion 106 towards the front of agricultural vehicle 102. The frame 104 may also have an aft portion 108 towards the rear of the agricultural vehicle 102. In one implementation, the agricultural vehicle 102 may be a sprayer 110. In one implementation, the sprayer 110 may be a self-propelled sprayer. The agricultural vehicle 102 may further comprise a boom 107 at the aft portion 108. Ground engaging members 111 are operably connected to the frame 104. The agricultural vehicle 102 may also comprise an operation station or cab 112 for the vehicle operator. The cab 112 may be disposed towards the fore portion 106 of the frame 104. In other implementations, it may be disposed about a center portion of the frame 104. The cab 112 may be positioned above the level of the ground engaging members 111. Because the cab 112 is elevated and may be in a forward position, the operator is provided with an unobstructed view down and forward of the agricultural vehicle 102. This configuration may also provide for a larger cab space for the operator.

Figure 16:
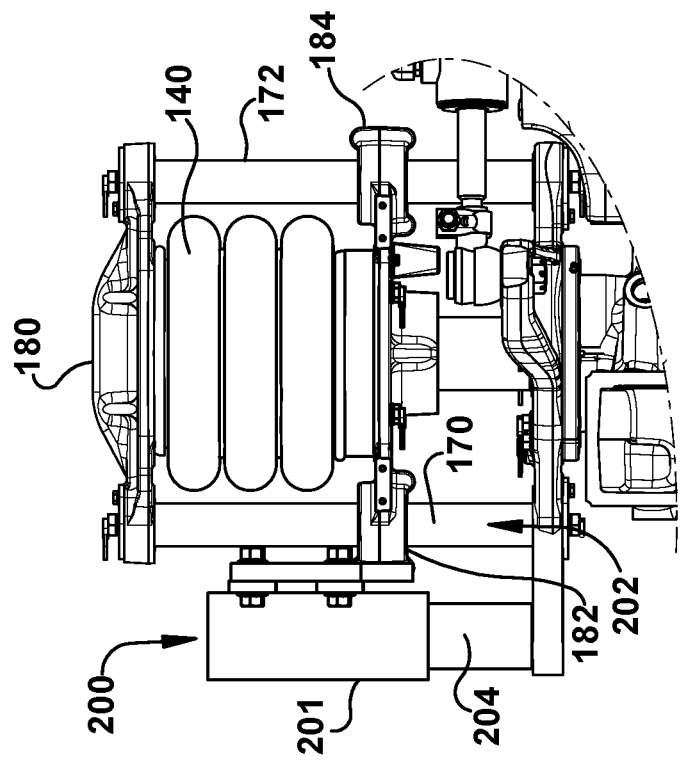
FIG. 16 is a front perspective view of another implementation of an agricultural vehicle suspension in a centered position.
Figure 17:
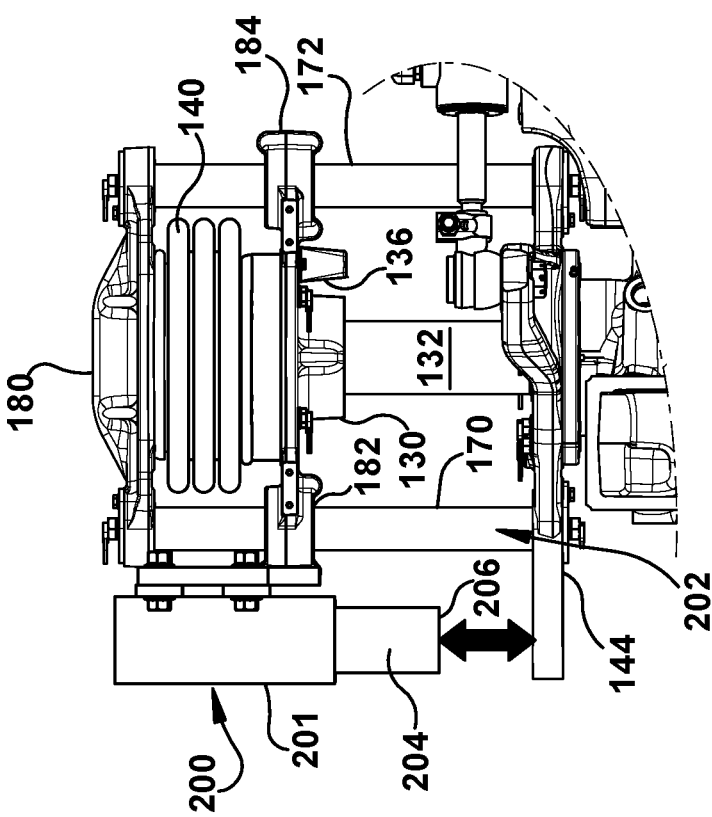
FIG. 17 is a front perspective view of another implementation of an agricultural vehicle suspension in a compressed position.
Figure 19:
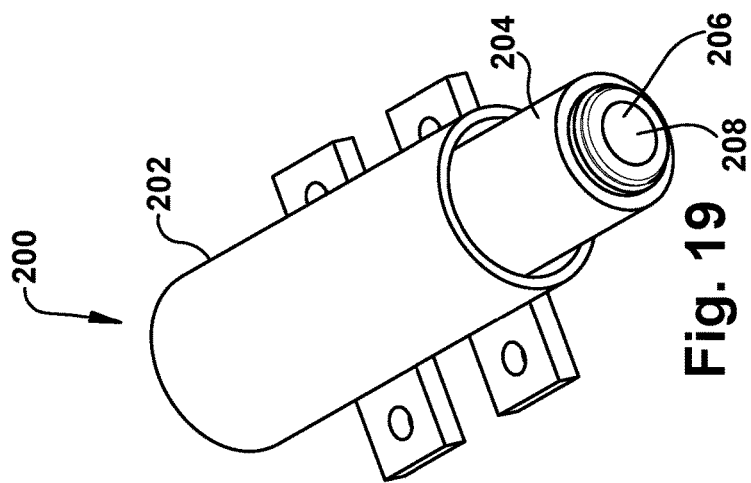
FIG. 19 is a perspective view of a component of an agricultural vehicle suspension.
Figure 18:
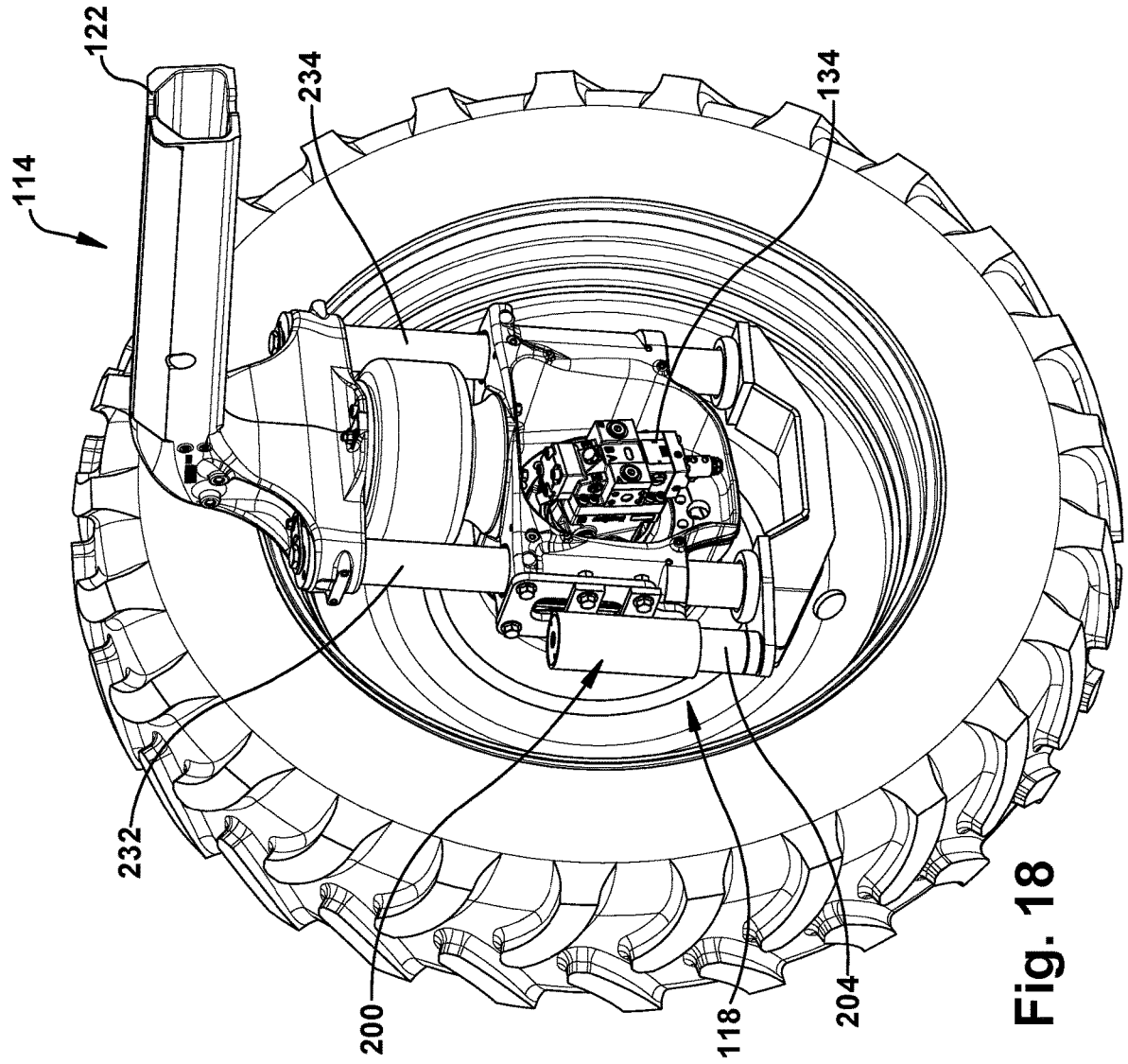
FIG. 18 is a front perspective view of another implementation of an agricultural vehicle suspension.

As shown in the FIGURES, the suspension reduction mechanism 100 may be utilized for increased operator comfort and agricultural vehicle stability. It may be utilized in a single spindle suspension application as shown in FIGS. 11-17. It may also be used in a dual spindle suspension application, as shown for example in FIGS. 2-10 and 18. Further, the agricultural vehicle suspension reduction mechanism 100 may be utilized on one, two, three, or all four ground engaging members 111 of the agricultural vehicle 102. The agricultural vehicle suspension reduction mechanism 100 may be used in a steerable application, as illustrated for example in FIGS. 2-17. In other implementations, the agricultural vehicle suspension reduction mechanism 100 may be used in a nonsteerable application as shown in FIG. 18. Steerable applications may be utilized with a single spindle suspension application or for a dual spindle suspension application. Nonsteerable applications may be utilized with a single spindle suspension application or for a dual spindle suspension application.

As will be described below, in one nonlimiting implementation, a mechanical, electromagnetic, hydraulic, pneumatic, or electromechanical stop body 200 may be one example of a component utilized to limit axial travel of a suspension assembly 118. In various implementations, the stop body 200 may be adjustable. One nonlimiting example of the stop body 200 may be a cylinder 201. It should be understood that the cylinder 201 may be operably connected to a first spindle 202. The first spindle 202 may be a steering spindle 170, 172 as described below. In other nonlimiting examples, the first spindle 202 may be one of the suspension spindles 132, 232, 234 such as for example the single suspension spindle 132 or the dual suspension spindle 232, 234.

With continuing reference to the FIGURES, transversely adjustable wheel axle assemblies, one of which is shown at 114 may be slidably received in tubular frame members (not shown) and support a suspension assembly 118. As described herein, the suspension assembly 118 may be steerable or nonsteerable. The suspension assembly 118 may be generally free of shock absorbers or dampers in one nonlimiting example. The suspension assembly 118 may comprise a suspension arm. The suspension arm may take any form chosen with sound engineering judgement including a solid member, a hollow tube, or a combination of both. In one nonlimiting implementation, a tube 122 having an inner end slidably received by a member. The tube 122 may be connected to a hydraulic tread adjust cylinder (not shown) for adjusting the vehicle tread. A knee joint 128 may be connected to the outermost end of the tube 122 and may comprise an upright journal area 130 slidably and rotatably mounting an upright strut shaft or suspension spindle 132 having a shaft axis 132a. The lower end of the strut shaft 132 may be fixed to a wheel support and motor housing 134, which may carry a hydraulically driven and steerable ground engaging member 111 or wheel. The upper end of the spindles 232, 234, 170, 172 may be operably connected to an upper spindle mount as described in further detail below. Nonlimiting implementations of the upper spindle mount may an upper spindle support bracket 242 (FIGS. 2-10, 18)

or an upper most spindle spacer 180 (FIGS. 11-17) as further described below. The upper end of the strut shaft 132 may be fixed to an upper mount 136 or spindle cap, and a spring 140 or other spring type of device connected to the top of the upper mount 136 may provide spring cushioning for the suspension spindle 132, 232, 234 and motor housing 134. Any spring 140 may be utilized with sound engineering judgment, including without limitation, an air spring, a coil spring, a leaf spring, or a nitrogen accumulator, which may be an accumulator used as a spring hydraulically. In another implementation the spring 140 may be configured to be utilized with a compressible fluid, such as air, for example.

A steering arm 144 may be rotatably mounted at the journal area 130 in an enlarged bore and may slidably receive a central portion of the suspension spindle 132. The strut shaft 132 may be free to move axially relative to the steering arm 44 so that the vertical position of the steering arm 144 may remain constant relative to the knee joint 128. A steering cylinder arm 150 may be fixed to the knee joint 128 by bolts or other fasteners and may extend in a fore-and-aft direction therefrom to a base end connection at 154 to a steering cylinder 156. The steering cylinder 156 may extends from the base end connection at 154 to a rod end connection at 158 with a radially projecting steering member 64 on the steering arm 144.

The steering arm 144 may support the lower ends of first and second upright steering spindles 170 and 172 generally parallel to the shaft axis 132a outwardly of the spring 140. The spindles 170 and 172 may be fixed to the steering arm 144 by bolts and a taper lock and extend upwardly to a location above the spring 140. An uppermost spindle spacer and spring support 180 may be bolted to the tops of the spindles 170 and 172, and the spring 140 may be contained between the upper mount 36 and the support 80. The upper mount 36 may comprise guides or spindle bracket 182 and 184 slidably received over the outer circumference of the spindles 170 and 172 for constraining the upper mount 136 for rotation in unison with the steering arm 144. The upper end of the strut shaft 132 may be connected to the upper mount 136 by a taper lock and a bolt and washer assembly 90 and may be keyed at 192 for constraining the strut shaft 132 for rotation with the upper mount 136. Therefore, steering torque may be transferred from the steering arm 144 through the spindles 170 and 172 and through the upper mount 136 to the strut shaft 132. As the steering cylinder 156 is extended and retracted, the strut shaft 132 will rotate in the journal area 130 about the shaft axis 132a with the steering arm 44 to steer the housing 34 and attached drive wheel structure.

The steering spindles 170 and 172 thereby may constrain the strut shaft 132 to maintain a constant angular relationship with the steering arm 144 while permitting the strut shaft 132 to move up and down in the journal area 130 and in the bore in the steering arm 144 to compress and relax the spring 140 as the wheel structure moves over the surface of the ground or as the weight supported by the wheel structure changes. Bumpers may provide protection for the suspension at the extreme positions of the strut shaft 132.

With continued reference to the FIGURES, an agricultural vehicle suspension 100 may comprise the first spindle 202. The first spindle 202 may be operably coupled with the spring 140 in a spindle axial direction S-S. The cylinder 201 may be operably coupled to the first spindle 202 in a stop body axial direction C-C. The cylinder 201 may be configured to limit an axial length of travel of the suspension assembly 120 relative to the first spindle 202. In one implementation, the spindle axial direction S-S may be substantially parallel to the stop body axial direction C-C.

In one nonlimiting example, the stop body 200, for example, the cylinder 201, may be operably connected to a cylinder bracket 210. The cylinder bracket 210 may be operably coupled to the spindles brackets 182, 184. The cylinder bracket 210 may be oriented substantially orthogonal to the spindle brackets 182, 184 such that the cylinder bracket 210 is substantially parallel in whole or in part to the cylinder 201. In another implementation, the cylinder bracket 210 may be operably connected to the spindle brackets 182, 184. In yet another implementation, the cylinder bracket 210 may be integrated with the spindle brackets 182, 184 to form a single unitary piece.

A stop bracket 212 may be disposed toward a bottom portion of the first spindle 202. In one implementation, the stop bracket 212 may be proximate to or integral with the steering arm 144. In another example implementation shown in FIG. 18, the stop bracket 212 may be proximate to or integral with a lower spindle stability bracket 240. A first axial length of travel may be defined by a portion of, or the full length of, one of the steering spindles 170, 172 extending from the upper portion proximate the spring support 180 to the lower portion proximate the steering arm 144 and/or stop bracket 212 and/or lower spindle stability bracket 240.

The stop body 200 may be any mechanical, electromechanical, electromagnetic, hydraulic or pneumatic component configured to limit the axial length of travel of the suspension assembly 118 relative to the steering spindles 170, 172. In another implementation, the stop body 200 may be configured to limit the axial length of travel of the suspension assembly 118 relative to the suspension spindles 132, 232, 234. Examples of the stop body 200 may include without limitation, the cylinder 201, a telescoping body, a bar, a collar, or other body configured to limit the axial length of travel of the suspension assembly 118. In other nonlimiting implementations, the stop body 200 can take other configurations, such as applying a perpendicular, substantially perpendicular or angular force to one of the spindles to restrict the axial length of travel of the suspension. In one such implementation, the stop body 200 may be a solenoid-actuated pin to lock suspension travel in one or both directions. In one nonlimiting example, the cylinder 201 may take the form of a single acting hydraulic cylinder, which may comprise an extendable ram portion 204. The ram portion may be threadedly engaged with the cylinder 201 in one example. The cylinder 201 may also be a double acting cylinder. The cylinder 201 may be hydraulic or pneumatic. In one implementation, the cylinder 201 may have extended position as shown in FIGS. 2-7, 11, 15-19 and a retracted position as shown in FIGS. 8, and 12-14. When the ram portion 204 of the cylinder 201 is in the extended position, a bottom 206 of the ram 204 may be configured to limit the axial length of travel of the suspension. In one example, the extendable ram portion may be extended at any extended position as desired or selected to limit the axial length of travel of the suspension. In one example, the ram portion may be fully extended. In another example, the ram portion 204 may be extended half way. In yet another example, the ram portion 204 may be extendable by about three quarters of its extendable length. In some examples, the adjustable position may be any length along the length of the ram portion 204. While the adjustability is described with respect to the ram portion 204, it should be understood that adjustability is contemplated for any implementation of the stop body 200 in order to limit the axial length of travel of the suspension.

In one implementation, the bottom 206 of the ram portion 204 may contact the stop bracket 212. The bottom 206 may comprise a stopper 208 comprised of metal, such as steel, but not limited thereto, or a rubber material. In another implantation, when a portion of the stop body 200 contacts the stop bracket 212, the suspension assembly 118 the axial length of travel is restricted, and thus, the range of axial length of travel of the suspension assembly 118 is less than the overall axial length of travel.

The agricultural vehicle suspension reduction mechanism 100 may be selectably engageable for on-road agricultural vehicle travel. In another implementation, the stop body 200, such as for example, the cylinder 201, may be selectably engageable for on-road agricultural vehicle travel. During operation in a field, the operator may desire to have the full length of axial travel of the suspension assembly 118 to compensate for uneven terrain, such as bumps, holes, or undulations. Unlike the field, on-road travel may have a more even underlying surface and higher agricultural vehicle velocity, so limiting the length of axial travel of the suspension assembly 118 may provide for greater agricultural vehicle stability and operator comfort. The engagability of the agricultural vehicle suspension reduction mechanism 100 may be manual or it may be automatic. It may be actuated by one or more of a steering sensor, a transmission, or a switch that may communicate with a controller (not shown) to send a signal to the stop body 200. An operator may select a road speed with a cruise control feature of the agricultural vehicle 102. The agricultural vehicle suspension reduction mechanism 100 may automatically engage for road transport based on selected velocity or current velocity. Likewise, in the field it could be selectable in a side hill or turn condition.

Figure 13:
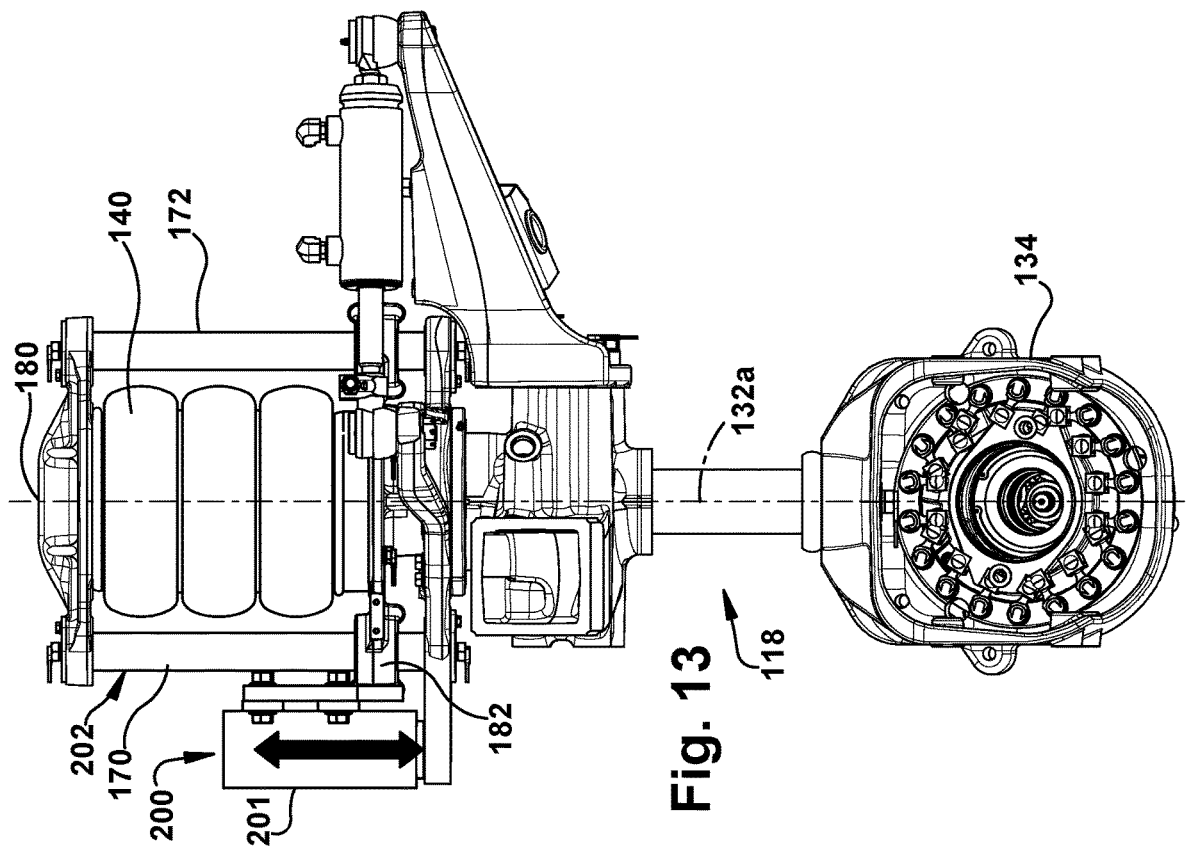
FIG. 13 is a front perspective view of another implementation of an agricultural vehicle suspension in an extended position.
Figure 12:
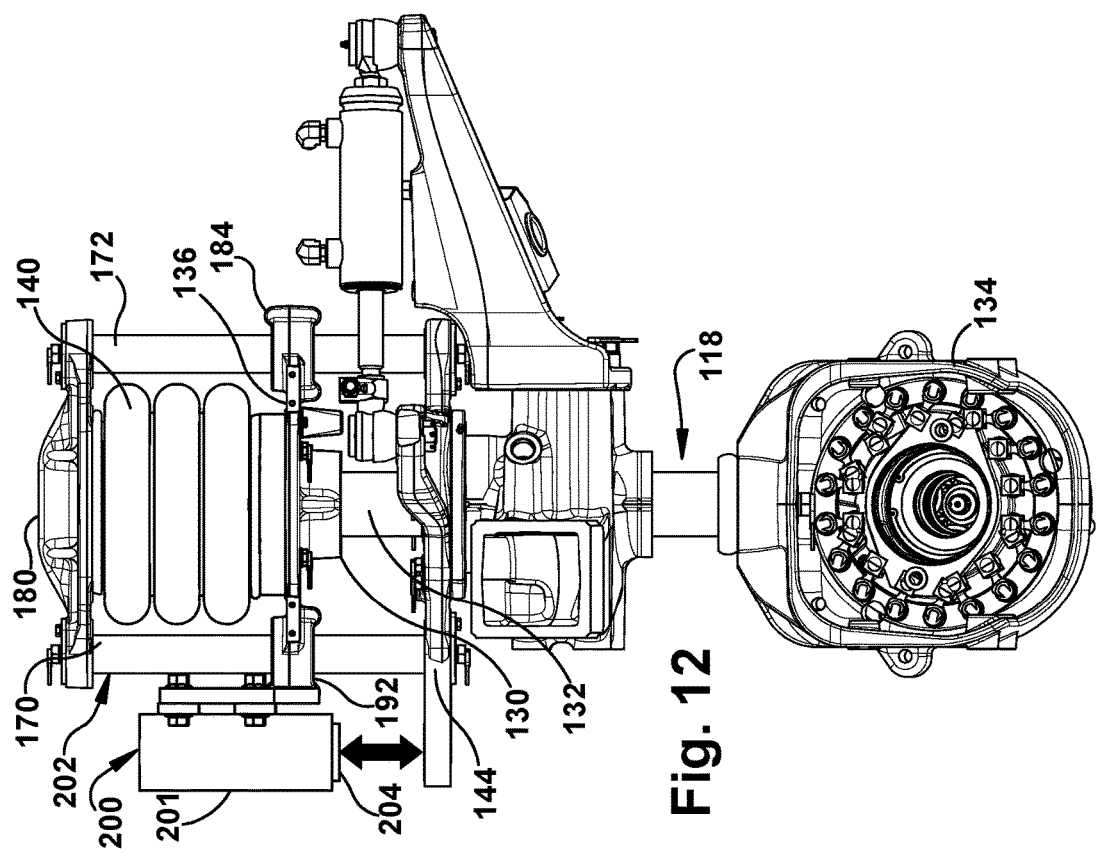
FIG. 12 is a front perspective view of another implementation of an agricultural vehicle suspension.
Figure 14:
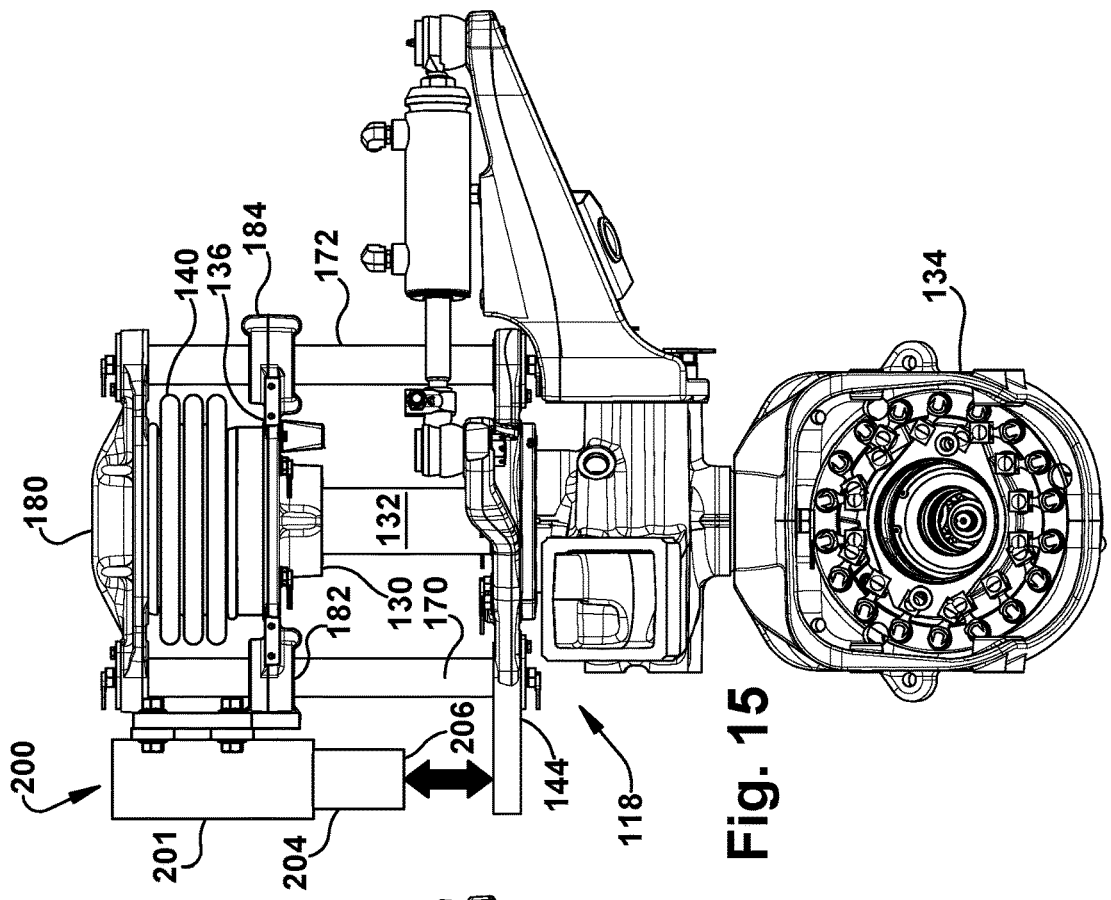
FIG. 14 is a front perspective view of another implementation of an agricultural vehicle suspension in a compressed position.
Figure 15:
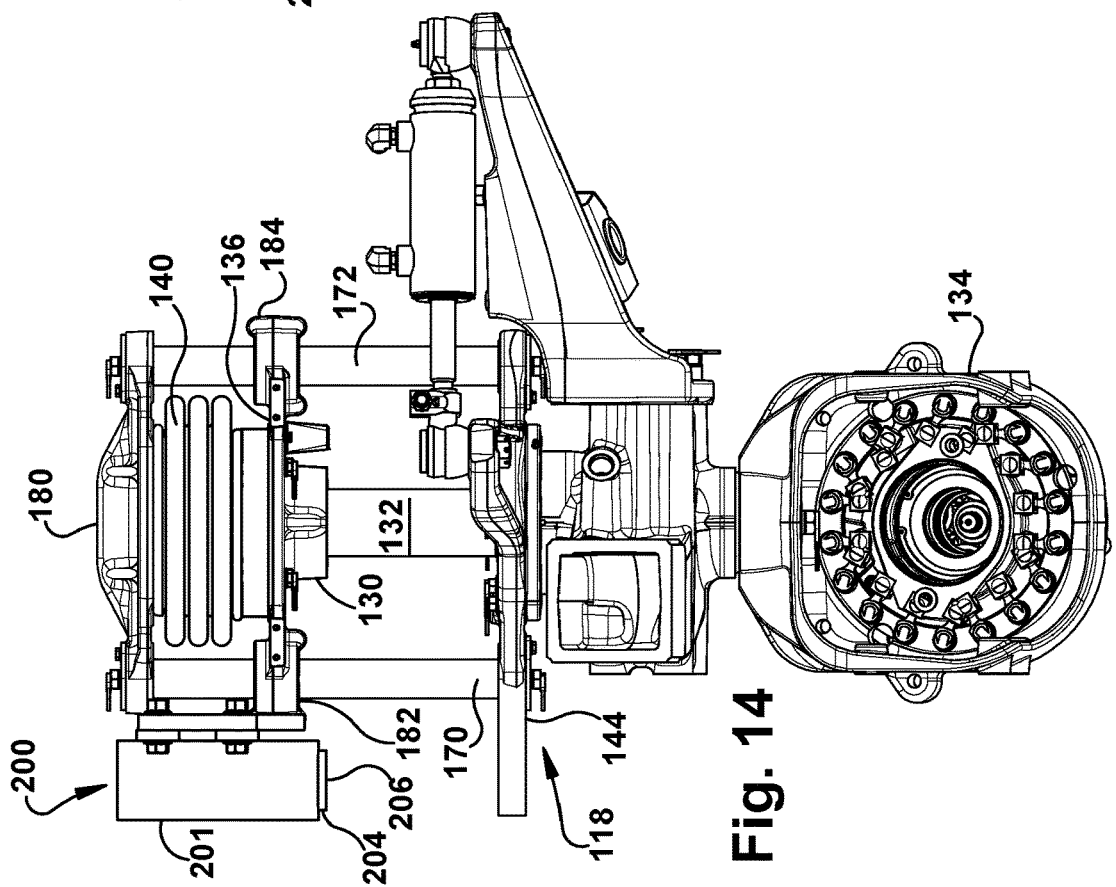
FIG. 15 is a front perspective view of another implementation of an agricultural vehicle suspension in a compressed position.

With reference to FIGS. 12-17, an example implementation of the spring 140 is shown. The spring 140 may have a centered position (FIG. 12), an expanded position (FIG. 13), and a compressed position (FIGS. 14 and 15). The centered, compressed and expanded positions are illustrated in an implementation of a single suspension spindle steerable suspension assembly 118. It should be understood that the centered, compressed, and expanded positions may also be applicable to a dual suspension spindle steerable assembly as shown in FIGS. 2-10. The centered, compressed, and expanded positions may also be applicable to a dual suspension spindle nonsteerable assembly as shown in FIG. 18. The centered, compressed, and expanded positions may also be applicable to a single suspension spindle non steerable assembly.

With continued reference to FIGS. 12-15, the spindle axial length of travel may be shown by the arrow S-S. The spindle axial length of travel may be a length, for example, of 200 mm or any other length chosen with sound engineering judgment. In the centered position shown in FIG. 12, the spindle brackets 182, 184 may be positioned at about a midway position on the steering spindles 170, 172. There may be an axial travel length of about 100 mm above the spindle brackets 182, 184. There may be an axial travel length of about 100 mm below the spindle brackets 182, 184. As the suspension assembly remains in a substantially centered position, the agricultural vehicle travels about substantially even terrain with no significant changes as the tires 111 travel over the ground. FIG. 13 also illustrates an example of the stop body being in a retracted position such that when the spring 140 is in an expanded position, there is no or little restriction on the spindle axial length of travel. FIG. 14 illustrates an example of the spring 140 being pressurized, as in the case when the wheel encounters a bump in the terrain. The suspension assembly 118 is able to travel the axial length of travel without restriction since the stop body 200 is in a retracted position. With reference to FIG. 15, the spring 140 is in the compressed position, but the stop body 200, such as the cylinder 201, is in the extended position. There is a limited distance shown between end of the ram portion 204 and the stop bracket 212. The ram portion 204 may be secured in the extended position. As such, as the spring 140 returns to its centered position or the expanded position, as shown in FIG. 16, the spindle axial length of travel is reduced because the ram portion may function as a rigid stop to prevent the spring 140 from expanding further. In the example, the spindle axial length of travel would be less than 200 mm, or less than the other chosen spindle axial distance. As shown in FIG. 17, the extended ram portion 204 may be secured or locked in position as the spring 140 is the in the compressed position. As such, as the agricultural vehicle 102 travels over the road way and encounters a bump or a turning event, the ram portion 204 is disposed to contact the stop bracket 212 to reduce or minimize the axial length of travel along the steering spindles 170, 172, which in turn provides greater stability to the agricultural vehicle and operator comfort.

With reference to FIG. 18, another implementation of an agricultural vehicle suspension reduction mechanism 100. In this example implementation, the agricultural vehicle suspension reduction mechanism 100 is a nonsteerable dual spindle suspension assembly. In this implementation the first spindle 202 may be one of the dual suspension spindles 232, 234. The suspension assembly 118 may travel axially about the dual suspension spindles 232, 234. An upper spindle support bracket 242 may surround each of the dual suspension spindles 232, 234 to provide stability and allow ease of axial travel relative to the suspension spindles. The stop body 200, which may take the form of the cylinder 201, may be operatively connected to the first spindle 202. In FIG. 18, the stop body 200, such as the cylinder 201, may be operably connected to one of the dual suspension spindles 232, 234. When the cylinder 201 has the ram portion 204 secured in an extended position, the ram portion 204 may restrict or limit axial travel about the suspension spindles 232, 234 by contacting the stop bracket 212, which may be part of the lower stability spindle bracket 240.

In another implementation, the agricultural vehicle suspension reduction mechanism may be modular such that its components as described herein may be added to an existing suspension assembly.

A method for limiting axial travel of a suspension utilizing the example implementations described herein may comprise the steps of applying pressure to the spring and then compressing the spring. The length of axial suspension travel may then be defined. The cylinder or stop body may be actuated to move a ram portion to an extended position. The extended cylinder position being in an axial direction parallel to the axial suspension travel, which may then reduce reducing the length of axial suspension travel. The method then may comprise the steps of decreasing pressure in the spring. This may then extend the spring to a centered position. The stop body or cylinder may be maintained in the extended position to maintain the reduced length of axial travel. The stop body may remain extended as the spring moves among the compressed, centered, and expanded positions to reduce or restrict the axial length of travel. The method may further comprise the step of retracting the cylinder into an unactuated position. As previously described, the method may comprise the step of the stop body contacting the stop bracket to reduce or restrict the axial length of travel.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An agricultural vehicle suspension, comprising:
   a suspension arm;
   a steering cylinder;
   a cylinder arm interconnecting the suspension arm and the steering cylinder;
   a spring;
   a first spindle and a second spindle operably coupled with the spring in a spindle axial direction, the first spindle and the second spindle being oppositely disposed outside a perimeter of the spring;
   an upper spindle mount and a lower spindle bracket, the upper spindle mount and the lower spindle bracket each operably connected to the first spindle and the second spindle, the upper spindle mount disposed above the spring, the lower spindle bracket disposed below the spring, the cylinder arm configured to to rotate in unison with the upper spindle mount or the lower spindle bracket;
   an adjustable stop body operably coupled to a cylinder bracket in a stop body axial direction, the stop body axial direction being substantially parallel to the spindle axial direction, the adjustable stop body configured to limit an axial length of travel of the suspension relative to the first spindle, the cylinder bracket operably coupled to the first spindle;
   the lower spindle bracket proximate a stop bracket, the stop bracket disposed proximate and outside an area defined between the first spindle and the second spindle, the stop bracket being substantial coaxial with the stop body axial direction; and
   a motor housing operably coupled to the spring.

2. The agricultural vehicle suspension of claim 1, wherein the adjustable stop body is a cylinder, the cylinder comprising an extended position and a retracted position, wherein the extended position of the cylinder is configured to limit the axial length of travel of the suspension.

3. The agricultural vehicle suspension of claim 1, wherein the stop body is actuated by one or more of a steering sensor, a transmission, a manual switch, or automatic engagement.

4. The agricultural vehicle suspension of claim 1, wherein the suspension is selectably engageable for on-road agricultural vehicle travel.

5. The agricultural vehicle suspension of claim 1, wherein the stop bracket operably connected with the first spindle and in selectable contact with the stop body, the stop bracket being proximate the lower spindle bracket or integral with the lower spindle bracket.

6. The agricultural vehicle suspension of claim 5, wherein the adjustable stop body is a cylinder, the cylinder comprises a first portion and a second portion operably extendable with the first portion, wherein the second portion configured to contact the stop bracket to reduce the axial length of travel of the suspension when in the extended position.

7. The agricultural vehicle suspension of claim 1, wherein the first spindle is a single suspension spindle.

8. The agricultural vehicle suspension of claim 1, wherein the first spindle and the second spindle are dual suspension spindles.

9. The agricultural vehicle suspension of claim 1, wherein the first spindle is a steering spindle and a suspension spindle, the motor housing configured to slidably receive the first spindle and the second spindle.

10. The agricultural vehicle suspension of claim 9, wherein the first spindle and the second spindle are steering spindles.

11. The agricultural vehicle suspension of claim 10, the second steering spindle being substantially parallel to the first steering spindle, the lower spindle bracket is a lower spindle stability bracket, the upper spindle mount is an upper spindle support bracket configured to provide stability and allow ease of axial travel relative to the first spindle and the second spindle.

12. The agricultural vehicle suspension of claim 8, further comprising a first steering spindle and a second steering spindle, wherein the adjustable stop body is a cylinder, the cylinder is operably connected to the first steering spindle or the first suspension spindle.

13. The agricultural vehicle suspension of claim 1, wherein the spring is one or more of an air spring, a coil spring, a leaf spring, or a nitrogen accumulator configured to act as a spring hydraulically.

14. A method for limiting axial travel of a suspension for an agricultural vehicle including:
an air spring;
a first spindle and a second spindle, the first spindle operably coupled with the air spring in a spindle axial direction, the first spindle and the second spindle oppositely disposed about a perimeter of the air spring;
a first suspension spindle operably coupled with the air spring in the spindle axial direction;
an adjustable stop body operably coupled to the first steering spindle or the first suspension spindle in a stop body axial direction, the adjustable stop body configured to limit an axial length of travel of the suspension relative to the first spindle, the stop body axial direction being parallel to the spindle axial direction, the adjustable stop body comprising an extended position and a retracted position, wherein the extended position of the stop body is configured to limit the axial length of travel of the suspension, the stop body configured to be actuated automatically or manually;
an upper spindle mount configured to receive the first spindle and the second spindle and disposed above the air spring;
a lower spindle bracket disposed below the air spring, the lower spindle bracket comprising a stop bracket, the stop bracket being substantially collinear with the stop body axial direction the stop bracket disposed proximate and outside an area defined between the first spindle and the second spindle;
a motor housing operably coupled to the air spring; and
wherein the suspension being selectably engageable for on-road agricultural vehicle travel, the suspension being steerable or nonsteerable, wherein the suspension is configured to be a single spindle suspension or a dual spindle suspension, stop body is actuated by one or more of a steering sensor, a transmission, a manual switch, or automatic engagement;
the method comprising:
applying pressure to the air spring;
compressing the spring;
defining a length of axial suspension travel;
actuating a cylinder to an extended position, the cylinder being operably connected to a first spindle, the first spindle being operably connected to the spring, the extended cylinder position being in an axial direction parallel to the axial suspension travel; and
reducing the length of axial suspension travel.

15. The method for limiting axial travel of a suspension of claim 14, further comprising:
decreasing pressure in the spring;
extending the spring to a centered position; and
maintaining the cylinder in the extended position to maintain the reduced length of axial travel.

16. The method for limiting axial travel of a suspension of claim 14, wherein the stop bracket operably connected to the first spindle, the axial length of travel being between the cylinder and the stop bracket.

17. An agricultural vehicle suspension, comprising:
an air spring;
a first spindle and a second spindle, the first spindle operably coupled with the air spring in a spindle axial direction, the first spindle and the second spindle oppositely disposed about a perimeter of the air spring;
a first suspension spindle operably coupled with the air spring in the spindle axial direction;
an adjustable stop body operably coupled to the first steering spindle or the first suspension spindle in a stop body axial direction, the adjustable stop body configured to limit an axial length of travel of the suspension relative to the first spindle, the stop body axial direction being parallel to the spindle axial direction, the adjustable stop body comprising an extended position and a retracted position, wherein the extended position of the stop body is configured to limit the axial length of travel of the suspension, the stop body configured to be actuated automatically or manually;
an upper spindle mount configured to receive the first spindle and the second spindle and disposed above the air spring;
a lower spindle bracket disposed below the air spring, the lower spindle bracket comprising a stop bracket, the stop bracket being substantially collinear with the stop body axial direction the stop bracket disposed proximate and outside an area defined between the first spindle and the second spindle;
a motor housing operably coupled to the air spring; and
wherein the suspension being selectably engageable for on-road agricultural vehicle travel, the suspension being steerable or nonsteerable, wherein the suspension is configured to be a single spindle suspension or a dual spindle suspension, stop body is actuated by one or more of a steering sensor, a transmission, a manual switch, or automatic engagement.

18. The agricultural vehicle suspension of claim 17, wherein the first spindle and the second spindle are both suspension spindles and steerable, the first spindle and the second spindle being slidably received in the motor housing.

19. The agricultural vehicle suspension of claim 17, where the first spindle and the second spindle are nonsteerable spindles and suspension spindles, the upper spindle mount is a an upper spindle support bracket surrounding each of the spindles to provide stability and allow ease of axial travel relative to the suspension spindles, the lower spindle bracket is a lower stability bracket.

* * * * *